(12) United States Patent
Van Doren et al.

(10) Patent No.: US 6,876,453 B2
(45) Date of Patent: Apr. 5, 2005

(54) METROLOGY SYSTEM FOR PRECISION 3D MOTION

(75) Inventors: Matthew Van Doren, Southbury, CT (US); Michael Kuechel, Oberkochen (DE); Christopher James Evans, Higganum, CT (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 10/454,285

(22) Filed: Jun. 4, 2003

(65) Prior Publication Data

US 2003/0223078 A1 Dec. 4, 2003

Related U.S. Application Data

(60) Provisional application No. 60/385,799, filed on Jun. 4, 2002.

(51) Int. Cl.$^7$ .............................. G01B 11/02; G01B 9/02
(52) U.S. Cl. ....................... 356/498; 356/486; 356/492; 356/493
(58) Field of Search ................................. 356/498, 492, 356/493, 486

(56) References Cited

U.S. PATENT DOCUMENTS

| | | | | |
|---|---|---|---|---|
| 3,601,490 A | * | 8/1971 | Erickson ..................... | 356/493 |
| 3,822,942 A | * | 7/1974 | Hock ........................... | 356/492 |
| 5,402,981 A | | 4/1995 | McMurtry et al. | |
| 5,681,981 A | | 10/1997 | McMurtry | |
| 5,940,180 A | * | 8/1999 | Ostby ......................... | 356/498 |

OTHER PUBLICATIONS

Evans, C.J., "Precision Engineering; an Evolutionary View", Cranfield Press, 1989; see Chapter 3, p. 43 for a brief discussion of the history of metrology frames.

Tutton, A.E.H., "A wavelength comparator for standards of length" Phil. Trans Roy. Soc, vol. 210 (1910) p. 1.

Donaldson, R.R., "Error budgets", Technology of Machine Tools, vol. 5: Machine tool accuracy UCRL–52960–5 (1980).

Slocum, A., "Precision Machine Design", Prentice Hall, 1992, Chapter 5.7 (Metrology frames').

Evans, C.J., "Precision Engineering: an Evolutionary View", Cranfield Press, 1989; Chapter 3, p. 43 (see brief discussion of metrology frames).

Bryan, J.B., "Design and construction of an 84 inch diamond turning machine", Precision Engineering, vol. 1, No. 1, p. 13.

Ruijl, T., "Ultraprecision Coordinate measuring machine", PhD Thesis, University of Delft, 2001.

Ruijl, T., et al., "Ultra–precision CMM Aiming for the Ultimate Concept", Proc. EUSPEN, Torino, May 2001.

Peggs, G.N. et al., "Design of a Compact High Accuracy CMM", CIRPAnnals, vol. 48/1 (1999), p. 417.

* cited by examiner

Primary Examiner—Gregory J. Toatley, Jr.
Assistant Examiner—Khaled Brown
(74) Attorney, Agent, or Firm—Francis J. Caufield

(57) ABSTRACT

The instant invention is a method and apparatus for the measurement, with low uncertainty, of the six degrees of freedom of a first structure relative to a second structure. The apparatus is comprised of compact, rigid, thermally stable structures. The invention uses linear displacement transducers which have no active pointing to maintain a desired orientation of the linear displacement transducers with other parts of the measurement system.

10 Claims, 7 Drawing Sheets

METROLOGY SYSTEM FOR PRECISION 3D MOTION

CROSS REFERENCE TO RELATED APPLICATION

This application claims priority from U.S. Provisional Patent Application No. 60/385,799 entitled METROLOGY SYSTEM FOR PRECISION 3D MOTION filed on Jun. 4, 2002 in the name of Matthew Van Doren, et al., the entire contents of which are incorporated herein by reference.

BACKGROUND OF THE INVENTION

This invention generally relates to interferometry and more particularly to apparatus and methods for interferometrically measuring the position and angular orientation of a body with high accuracy as it travels along a prescribed path, e.g., a nominally straight line in, for example, a process for determining the shape of wavefronts and optical surfaces, such as aspherical surfaces.

There are a number of applications in which an object needs to be scanned accurately along a prescribed trajectory. This is frequently achieved by servo positioning the object using sensors referenced to a mechanical reference structure (or metrology frame). When large motions are required, the metrology frame typically becomes large and hence susceptible to mechanical vibrations, thermal drifts, and other perturbations.

Metrology systems for ultra-precision machines, such as photolithography tools, diamond turning machines, etc., use stable reference frames probed at normal incidence by non-contact gauges, typically laser interferometers. When only small motions are required in one or more degrees of freedom, capacitance gauges or even contacting gauges such as LVDTs may be used. The reference surfaces generally have dimensions similar to those of the travel to be measured in each dimension.

Because of the continuing need for highly precise measuring instruments, it is a primary object of the present invention to provide a compact interferometric motion tracking architecture for precisely measuring the position and angular orientation between two objects undergoing relative motion.

It is another object of this invention to provide method(s) and apparatus for interferometrically measuring relative or absolute distances with high accuracy.

It is another object of the invention to provide method(s) and apparatus for interferometrically measuring slopes, curvatures, and shapes of optics with high accuracy.

It is still another object of the present invention to provide interferometric method(s) and apparatus for high accuracy measurement using redundant, self-checking metrology of the straightness of motion of a moving element along its travel.

Another object of this invention is to provide comparative, self-checking methods for calibrating the straightness of a scanning path in an interferometer.

Other objects of the invention will, in part, be obvious and will, in part, appear hereinafter when the following description is read in connection with the drawings.

SUMMARY OF THE INVENTION

The invention described herein solves problems with prior art approaches by using large dynamic range displacement sensors that measure with respect to a plurality of reference planes that are not perpendicular to the conventionally used, Cartesian coordinate system. The size of the reference planes required depends on the scan lengths required and the orientations of the reference planes. The invention is particularly advantageous when one linear degree of freedom is large compared to the other two. A preferred embodiment of the invention uses zero shear interferometers with retroreflectors and constant deviation assemblies mounted on the moving member. Hence, the moving member is entirely passive.

The instant invention is a method and apparatus for the measurement, with low uncertainty, of the 6 degrees of freedom of a first structure relative to a second structure. The apparatus is comprised of compact, rigid, thermally stable structures. The invention uses linear displacement transducers which have no active pointing to maintain a desired orientation of the linear displacement transducers with other parts of the measurement system. The apparatus uses reference planes that have a largest dimension significantly smaller than the largest distance of travel between the first and second structures. In addition, the motion between the two structures, as measured by the apparatus, may be calibrated using selected artifacts.

The linear transducers are preferably interferometers, which are thermally stable, have nearly zero beam shear, and have very low cyclic errors. The reference planes are preferably mirrors made of such thermally stable materials as Zerodur® or Invar®.

In one preferred implementation, the beamsplitters of the interferometer and the reference planes are integrated into a single "reference structure", preferably made from thermally stable materials such as Zerodur® or Invar®, while the second moving structure carries retroreflectors and constant deviation assemblies to redirect interferometer beams to and from the reference structure.

In another preferred implementation, the beamsplitters of the interferometer may be integrated into the moving structure which also carries the constant deviation assemblies.

The constant deviation assemblies may comprise constant deviation prisms, multifaceted reflecting surfaces, integrated components having one or more refracting and/or reflecting surfaces, and integrated components having a plurality of prismatic refracting elements or various combinations thereof.

BRIEF DESCRIPTION OF THE DRAWINGS

The structure, operation, and methodology of the invention, together with other objects and advantages thereof, may best be understood by reading the detailed description in connection with the drawings in which each part has an assigned a descriptive label or numeral that identifies it wherever it appears in the various drawings and wherein.

DETAILED DESCRIPTION

The preferred embodiment of the present invention is a motion monitoring system that allows interferometric, 6 degree of freedom, measurement of the motion of a passive target (carrying only retroreflectors and constant deviation prisms and the interferometer subsystem in one implementation) with respect to a static reference structure containing both the beamsplitters for 6 or more, preferably, zero-shear interferometers and reference planes (mirrors) arranged at appropriate angles to:

1. Provide desired position resolution in each degree of freedom; and
2. Minimize reference structure dimensions for a required scan distance While not necessary to completely measure all six degrees of freedom of an object's position and orientation with respect to another, use of more than 6 interferometers, with appropriately chosen reference mirror orientations, allows increased effective resolution for a given reference structure dimension and scanning distance.

Figure 1:
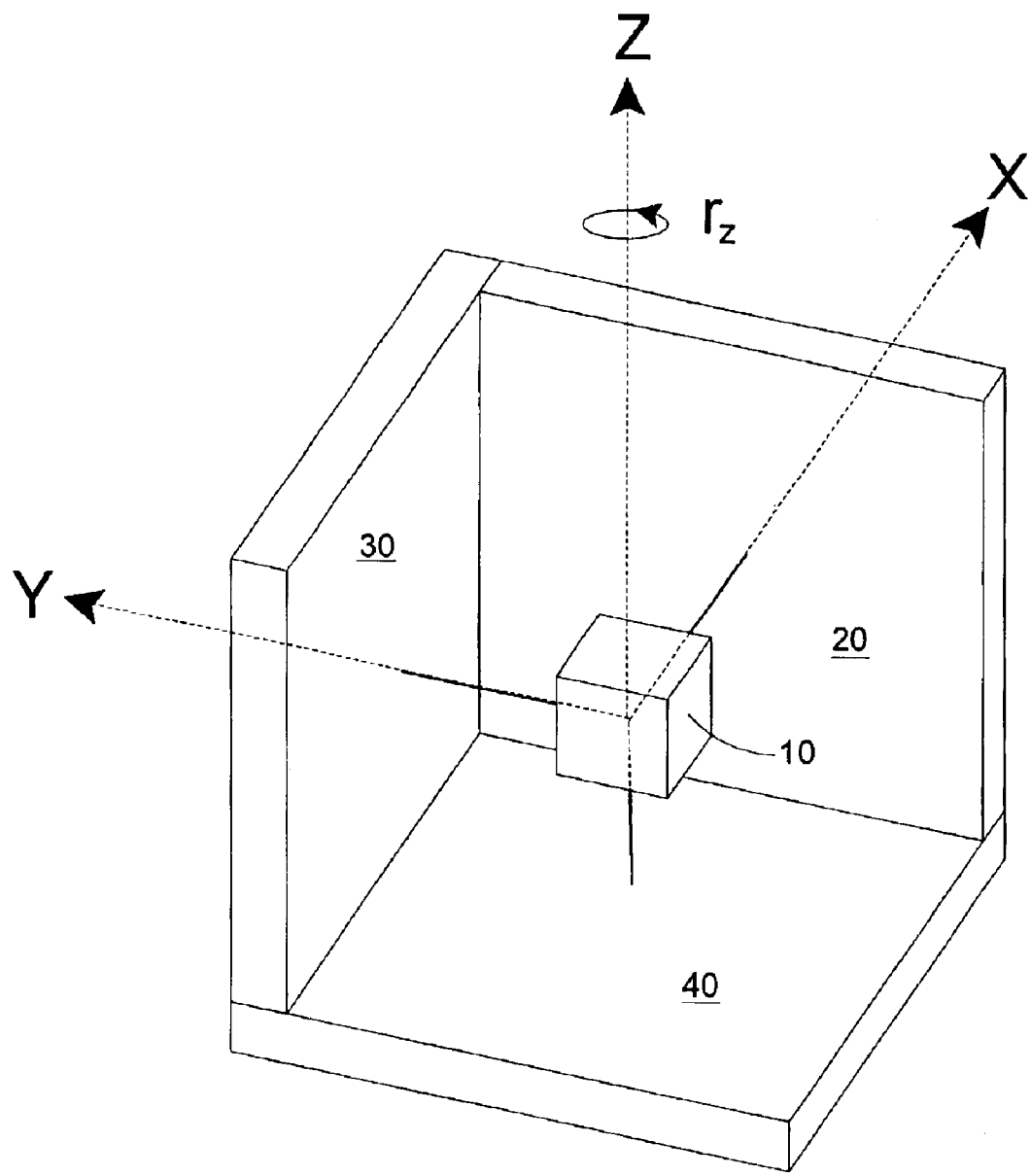
FIG. 1 is a diagrammatic perspective view of a conventional approach to a metrology frame were some set of reference planes (shown conceptually in FIG. 1) is used.

To understand the invention and its advantages, consider first the conventional approach to a metrology frame (e.g., Rogers W. A. "Studies in Metrology" Proc AAAS, Vol 18 (1883) p287, Bryan J. B. "Design and construction of an 84 inch diamond turning machine" Precision Engineering, Vol 1, Number 1, p13, Donaldson R. R. "Error budgets" Technology of Machine Tools Vol 5: Machine tool accuracy UCRL-52960-5 (1980), etc) where some set of reference planes (shown conceptually in FIG. 1) is used. An object of interest 10 is moved in free space, and its position is measured with respect to a reference system comprising 3 planes, 20, 30, and 40, arranged to be mutually perpendicular. If it can be assumed that there is no significant rotation about the three linear degrees of freedom (X, Y, and Z) and if three independent measurements of distance are made, then the position of a first body (or object 10) with respect to a second body (the set of three reference planes 20, 30, and 40) is known. A well-known improvement uses two parallel displacement measurements (with a known spacing between them) in each of the three degrees of freedom. Hence, the angular motions are also measured, but the required size of the reference planes becomes the travel distance in a specific direction (x, y or z) plus the separation of the measurement beams. Note that any machine which involves the measurement of displacement, position or extent necessarily involves a metrology loop. A metrology frame, however, is frequently taken to mean a separate structure mounted in such a manner that it is not deformed by changes in load arising as the moving member is displaced.

Figure 4:
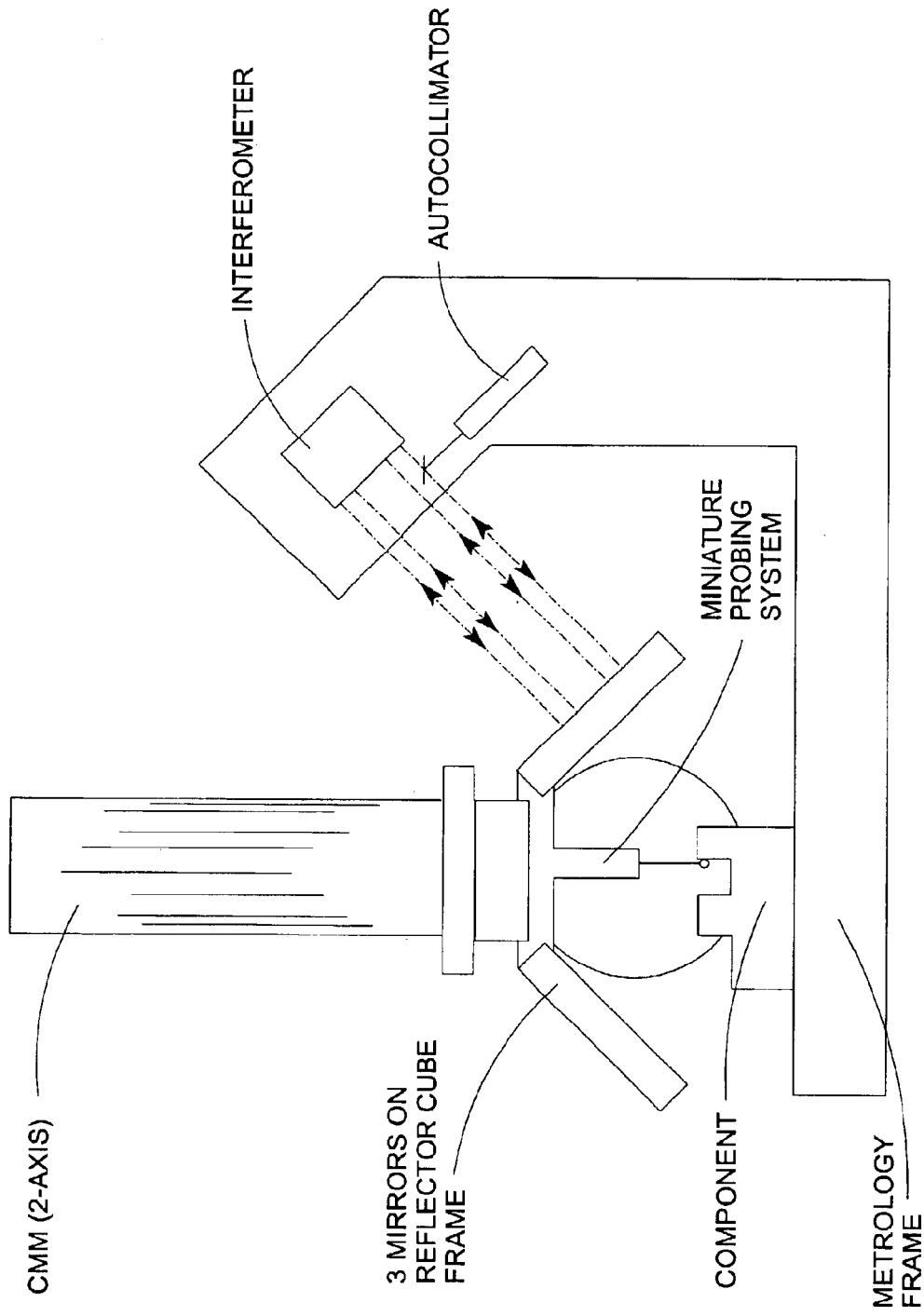
FIG. 4 is a diagrammatic elevational view of a prior art device.

A variant of the generic approach described above has been used at the UK National Physical Laboratory (Peggs G. N. et al "Design of a Compact High Accuracy CMM" CIRP Annals, Vol 48/1 (1999) p417 and also see FIG. 4), where an orthogonal array of mirrors is added to the ram of a coordinate measuring machine and its position is sensed by interferometers. Again the reference planes are larger than the machine motions.

Figure 5:
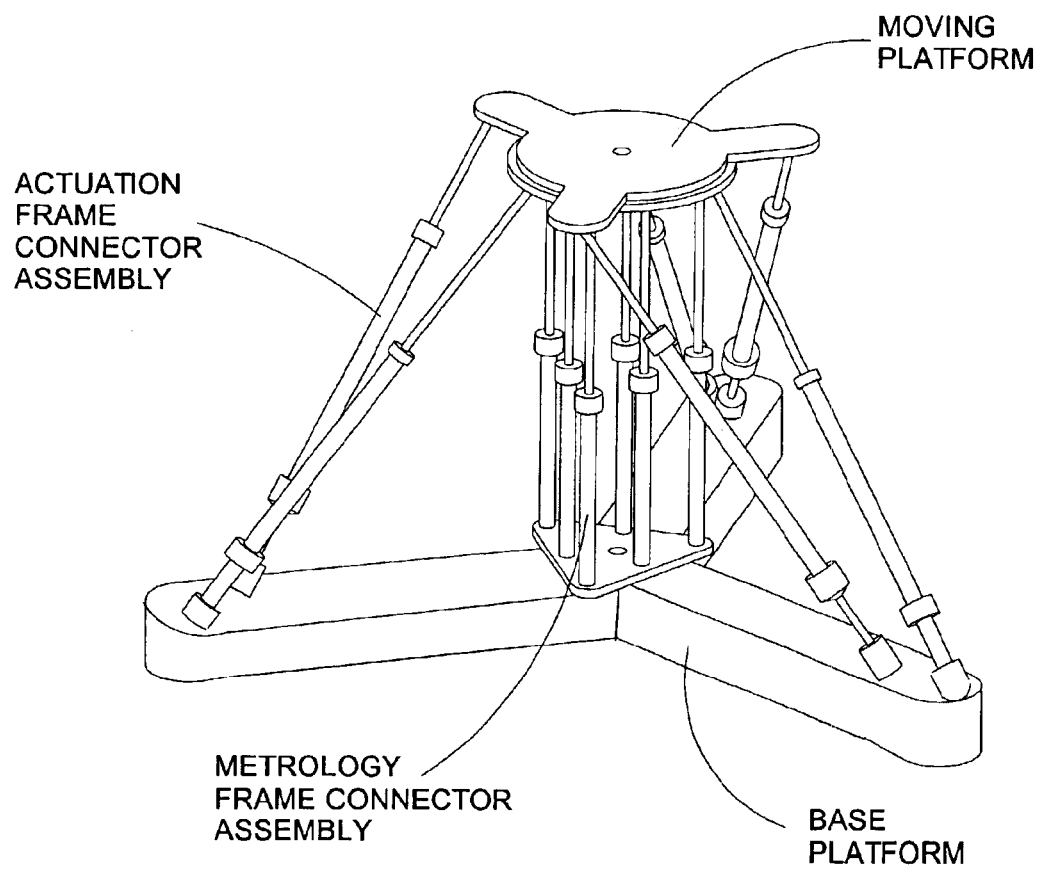
FIG. 5 is a diagrammatic perspective view of another prior art device.

Well-known Stewart platforms are devices in which six linear actuators are used, via spherical joints, to provide six degree of freedom motions. Early applications included tire testing and flight simulators. More recently (e.g., Ziegert, FIG. 5) ideas have been discussed to measure the length of six actuators and hence deduce the position of a rigid body in space. Such approaches assume that the spherical bearings are perfect. They also are isomorphic to well known triangulation systems, where "beam pointing" is required. The displacement measurement must track in angular coordinates the position of the target.

Figure 2A:
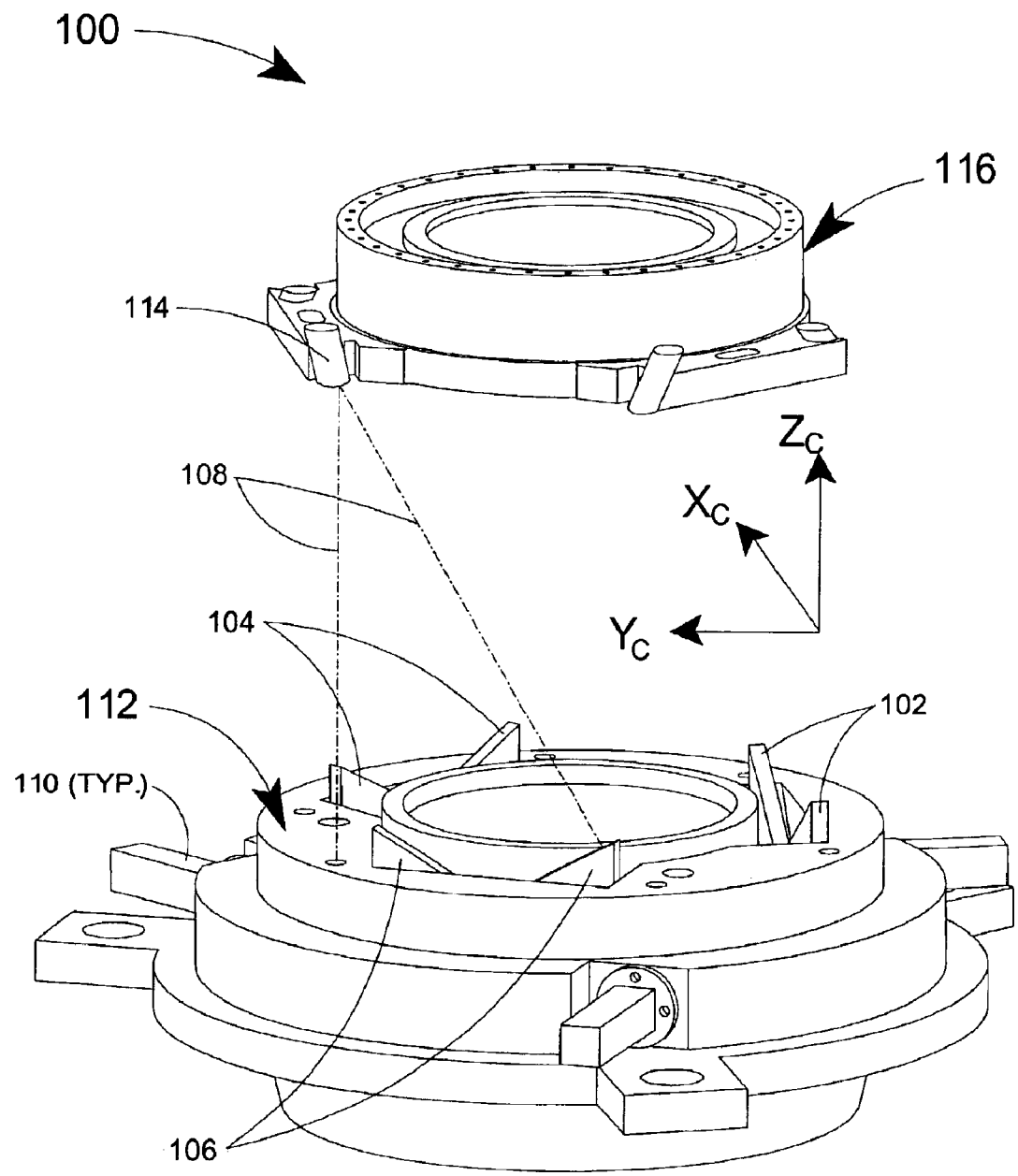
FIG. 2A is a diagrammatic perspective view of an embodiment of the invention.
Figure 2B:
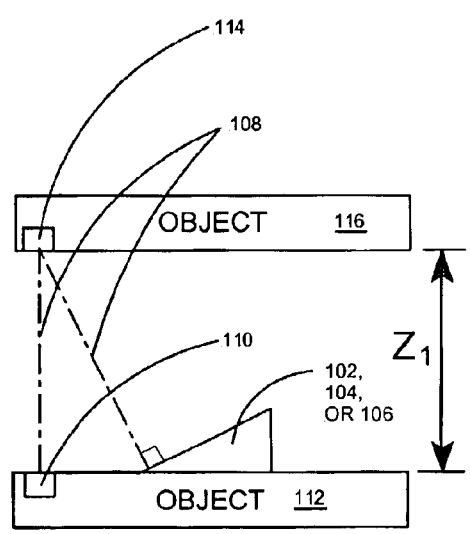
FIGS. 2B and 2C are diagrammatic two-dimensional elevational views of one of the interferometers of FIG. 2A shown in two positions of displacement.
Figure 2C:
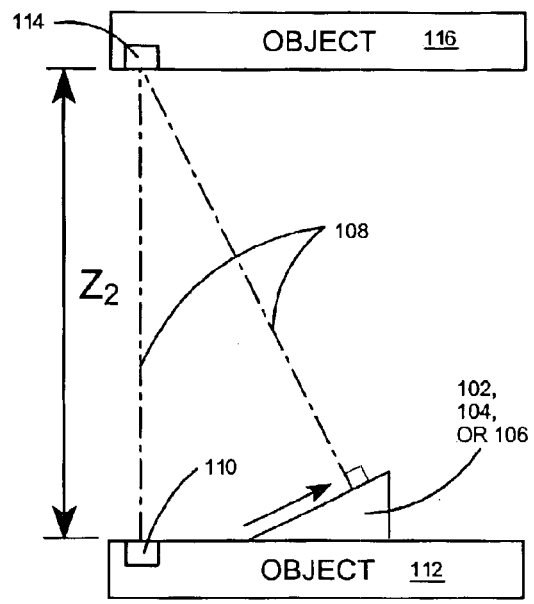

In contrast, the present invention requires no active tracking. One implementation of the invention can be understood from the following illustration in FIG. 2A. Here, there is shown an interferometric motion monitoring system 100 comprising six inclined reference planes or surfaces that can be seen orientated in three symmetric pairs (102, 104, and 106) about the center line of the system. A measurement beam 108 emerges vertically from the beamsplitter of a beam delivery system 110 (typical) that is part of a well-known interferometer subsystem enclosed in the lower structure or metrology frame base 112, reflects through a constant deviation prism (CDP) or equivalent assembly 114 that redirects it at 30 degrees to a corresponding one of an inclined reference plane (102, 104, or 106), whence it reflects—at normal incidence—back to the CDP 114 and hence back to the interferometer subsystem 110. The constant deviation prism or assembly 114 may be selected from the group comprising constant deviation prisms, multifaceted reflecting surfaces, integrated components having one or more refracting and/or reflecting surfaces, and integrated components having a plurality of prismatic refracting elements. One particularly preferred assembly is shown in FIG. 2E at 117 where it is seen to comprise, in sequence, a right prism 119, a Porro 121, and Penta prism 123 similar in function to the embodiment of FIG. 5 of U.S. Pat. No. 6,198,574 issued to Henry Allen Hill on Mar. 6, 2001 with the title "Polarization Preserving Optical Systems", the entire contents of which are incorporated herein by reference.

As the target (moving body 116) moves in the Z direction (ZC in FIG. 2A), the measurement beam 108 moves laterally along its corresponding assigned inclined reference surface. This can be seen more clearly in FIGS. 2B and 2C, which show how the measurement beam 108 scans a respective inclined reference surface at normal incidence as the moving body 116 changes its position along the Z-axis.

Outputs of the six individual beams (108) change in a pattern determined by the orientation of the reference planes, as does angular motion about any one of the linear axes.

The deviation angle of the CDP 114 (and of the related reference plane) modifies the resolution of the interferometer in the Z and X, Y directions. If the CDP 114 is a 90° retroreflector, then the displacement measurement contains information only on movement in the Z-direction, with a resolution exactly equivalent to the resolution of an interferometer subsystem 110.

Figure 2D:
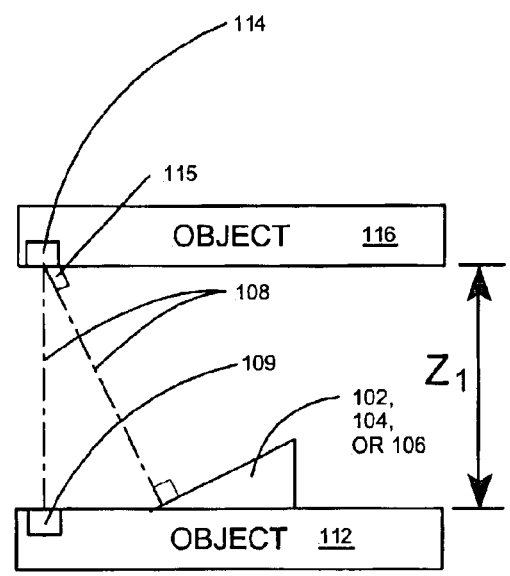
FIG. 2D is a diagrammatic two-dimensional view of another embodiment of the invention where the interferometer beamsplitter is placed on a moving body or object.
Figure 2E:
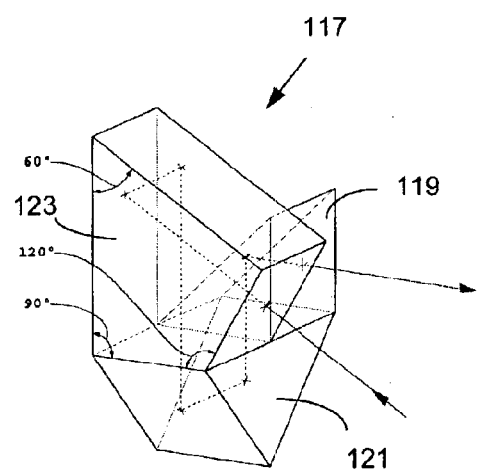
FIG. 2E is a diagrammatic perspective view of a constant deviation assembly used in practicing the invention.

Reference is now made to FIG. 2D which shows another embodiment of the invention in which the beamsplitters (115) of the interferometers may be integrated into the moving structure or object 116 which also carries the constant deviation assemblies while a modified beam delivery system 109 remains in the stationary object 112.

In another implementation, pure Z-axis interferometers (using retroreflectors) are combined with interferometers using CDPs. A minimum of 6 interferometers must be used to obtain information on 6 degrees of freedom; at least 3 of those 6 interferometers must use CDPs and inclined reference planes.

In a further implementation, more than the minimum number of interferometers may be used to optimize system performance. These additional, independent measurements allow improvements in resolution from the results of averaging multiple measurements. Thus, system designers implementing this invention may optimize the number of interferometers, reference planes, and reference plane orientations to obtain desired resolution and measurement uncertainty in the degrees of freedom of interest, desired system resonant frequencies, thermal stability, and other desired characteristics.

Figure 3A:
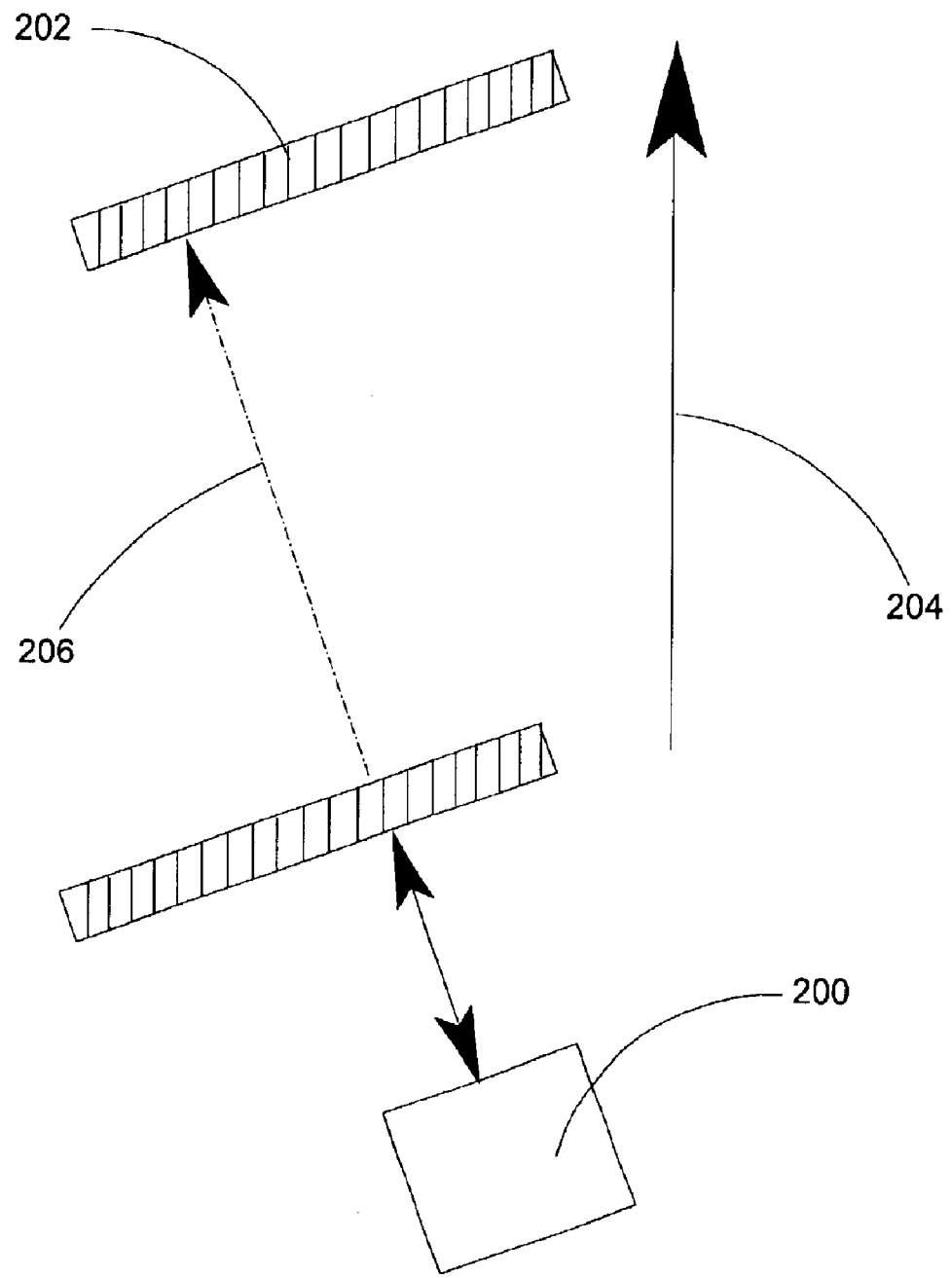
FIG. 3A is a diagrammatic elevational view of another embodiment of the invention.

Reference is now made to FIG. 3 which shows an implementation of the invention in which an interferometer subsystem 200 is mounted on a body and an inclined reference plane 202 on a second body to form a distance measuring interferometer employing two plane mirrors arranged along an interferometer axis that is tilted with respect to the direction of motion 204 of the moving body. As the second body moves, a measurement beam 206 from the interferometer subsystem 200 scans the inclined reference surface 202, moving left and right in accordance with the separation between the bodies. It should be clear that this embodiment and that of FIG. 2A share a common characteristic in that at least a portion of their respective measurement beams travel along an optical path that is tilted with respect to the direction of motion between the bodies as they move relative to one another.

It will be clear that there are available well-known interferometric subsystems and reflecting components that may be used to implement the invention. As an example of interferometric subsystems that may be used, reference may be had to "Differential interferometer arrangements for distance and angle measurement: Principles, advantages, and applications", C. Zanoni (VDI Berichte Nr. 749, 1989), the entire contents of which are incorporated herein by reference. Those skilled in the art will also recognize that the output beam from the constant deviation assemblies used herein may vary so long as the variation is within the tolerance range within which sensible interferometric information may be extracted from measurement and reference beams.

Figure 3B:
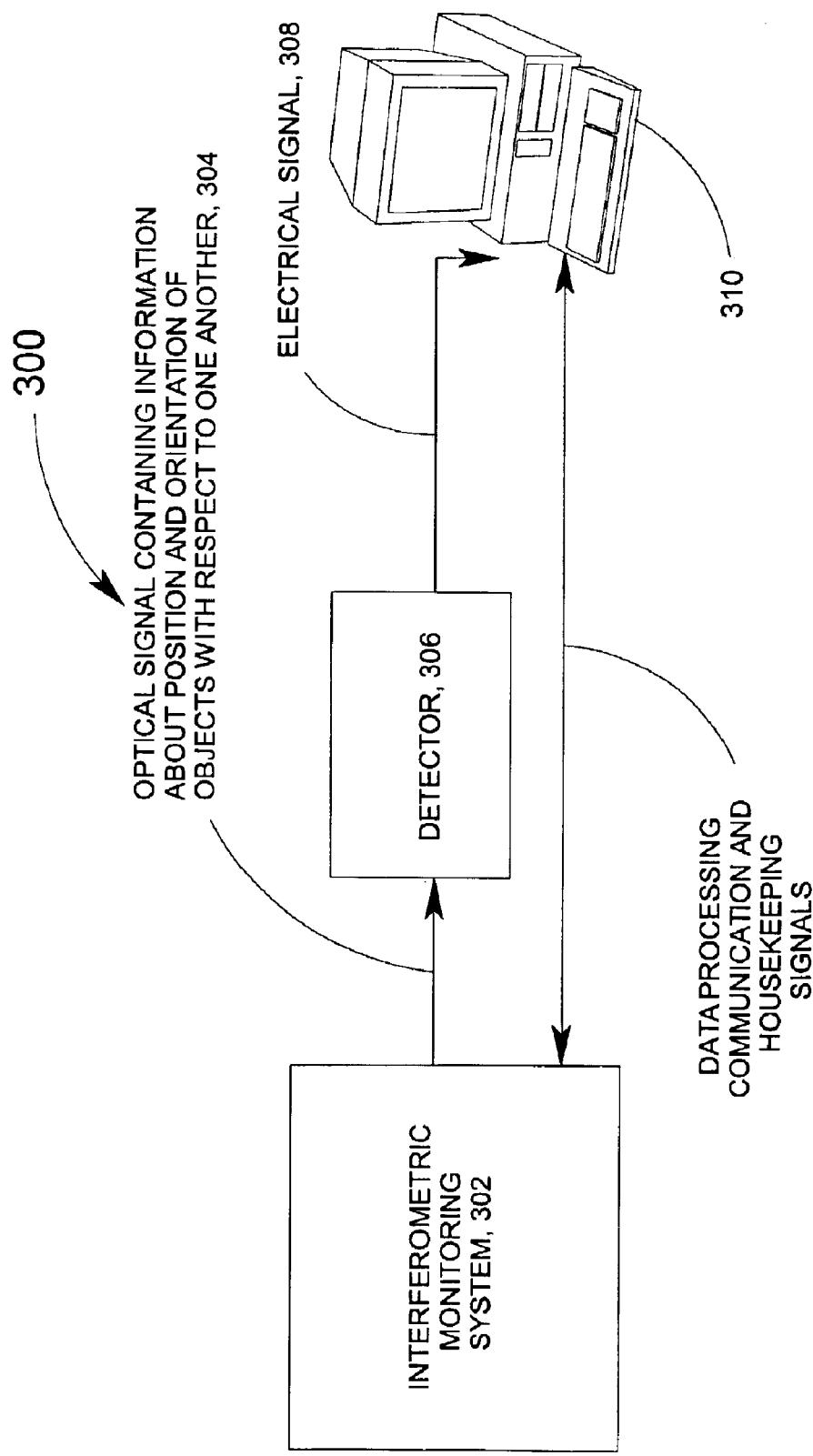
FIG. 3B is a diagrammatic block diagram for a general system architecture incorporating the inventive motion monitoring system.

Reference is now made to FIG. 3B which shows a block diagram for a system 300 having architecture incorporating the embodiments of the invention. As shown, an interferometric monitoring system 302 provides one or more optical signals 304 containing information indicative of the position and/or orientation of one of the objects with respect to the other. The optical signals 304 are sent to a detector 306 which converts them to electrical form as electrical signals 308 which are passed to a computer 310 provided with appropriate software, including algorithms, to carry out data processing, such as phase analysis, to determine the position and orientation of the bodies. The computer 310 also serves as a means of communication between operator and monitoring system, as well as for performing general housekeeping functions.

Based on the teachings of the invention, other changes to the invention will occur to those skilled in the art and such changes are intended to be within the scope of the claims.

What is claimed is:

1. Apparatus for interferometrically measuring the motion of a first structure relative to a second structure, said apparatus comprising:

at least two compact, rigid, thermally stable structures mounted for relative motion with respect to one another;

at least one interferometer subsystem and one inclined reference reflector mounted on one of said structures; and a constant deviation assembly mounted on said other structure, said interferometer subsystem being configured and arranged to project a measurement beam onto said constant deviation assembly over a predetermined range of motion between said structures such that said measurement beam scans along said inclined reference reflector at normal incidence and is retroreflected thereby back to said interferometer subsystem via said constant deviation assembly to provide a signal indicative of at least one degree of freedom between said structures.

2. The apparatus of claim 1 wherein at least one inclined reference reflector is mounted on one of said structures and said constant deviation assembly and said interferometer subsystem are mounted on said other structure.

3. The apparatus of claim 1 comprising three pairs of reference reflectors mounted on said structure with at least three of them being inclined, six interferometer subsystems, and six constant deviation assemblies to measure six degrees of freedom between said structures.

4. The apparatus of claim 3 where more than six interferometer subsystems are used.

5. The apparatus of claim 1 wherein said constant deviation assembly is selected from the group comprising constant deviation prisms, multifaceted reflecting surfaces, integrated components having one or more refracting and reflecting surfaces, and integrated components having a plurality of prismatic refracting elements.

6. A method for interferometrically measuring the motion of a first structure relative to a second structure, said method comprising the steps of:

mounting at least two compact, rigid, thermally stable structures for relative motion with respect to one another;

mounting at least one interferometer subsystem and one inclined reference reflector on one of said structures;

mounting a constant deviation assembly on said other structure; and directing a measurement beam onto said constant deviation assembly over a predetermined range of motion between said structures such that said measurement beam scans along said inclined reference reflector at normal incidence and is retroreflected thereby back to said interferometer subsystem via said constant deviation assembly to provide a signal indicative of at least one degree of freedom between said structures.

7. The method of claim 6 comprising three pairs of reference reflectors mounted on said structure with at least three of them being inclined, six interferometer subsystems, and six constant deviation assemblies to measure six degrees of freedom between said structures.

8. The method of claim 7 where more than six interferometer subsystems are used.

9. The method of claim 6 wherein at least one inclined reference reflector is mounted on one of said structures and said constant deviation assembly and said interferometer subsystem are mounted on said other structure.

10. The method of claim 6 wherein said constant deviation assembly is selected from the group comprising constant deviation prisms, multifaceted reflecting surfaces, and integrated components having one or more refracting and reflecting surfaces, and integrated components having a plurality of prismatic refracting elements.

* * * * *